United States Patent [19]
Lomashevitch et al.

[11] Patent Number: 5,446,573
[45] Date of Patent: Aug. 29, 1995

[54] ALL-OPTICAL REGENERATOR

[75] Inventors: Svjatoslav A. Lomashevitch; Yuri V. Svetikov, both of Sankt-Peterburg

[73] Assignee: Samsung Electronics Co., Ltd., Kyungki-do, Rep. of Korea

[21] Appl. No.: 85,949

[22] Filed: Jul. 6, 1993

[30] Foreign Application Priority Data

Jul. 6, 1992 [SU] U.S.S.R. ............... 5066099

[51] Int. Cl.$^6$ ............................. H04B 10/02
[52] U.S. Cl. ..................... 359/158; 359/174; 359/176; 359/333; 372/96; 385/14
[58] Field of Search .............. 359/174, 176, 179, 333, 359/345, 349, 158; 385/14, 15; 372/94

[56] References Cited

U.S. PATENT DOCUMENTS

| | | | |
|---|---|---|---|
| 4,742,576 | 5/1988 | McMahon | 359/174 |
| 5,001,523 | 3/1991 | Lomashevich et al. | 357/19 |
| 5,369,520 | 11/1994 | Auramopoulos et al. | 359/174 |
| 5,379,143 | 1/1995 | Takano | 359/174 |

*Primary Examiner*—Leo H. Boudreau
*Assistant Examiner*—Rafael Bacares
*Attorney, Agent, or Firm*—Charles R. Donohoe; Robert A. Westerlund; Stephen R. Whitt

[57] ABSTRACT

Disclosed herein is an all-optical regenerator including two stripe waveguides, each waveguide having an input and an output optical contacts; a nonlinear ring resonator comprising a source laser, a multi-sectional semiconductor laser, mirrors, four phase modulators, and means for controlling the source laser, the multi-sectional laser and the four phase modulators; and two directional couplers, each coupler being positioned between the nonlinear ring resonator and each of the waveguides. The all-optical regenerator in accordance with the present invention performs such functions as clock recovery, pulse reshaping and amplification of optical signals without going through intermediate electronic stages.

10 Claims, 8 Drawing Sheets

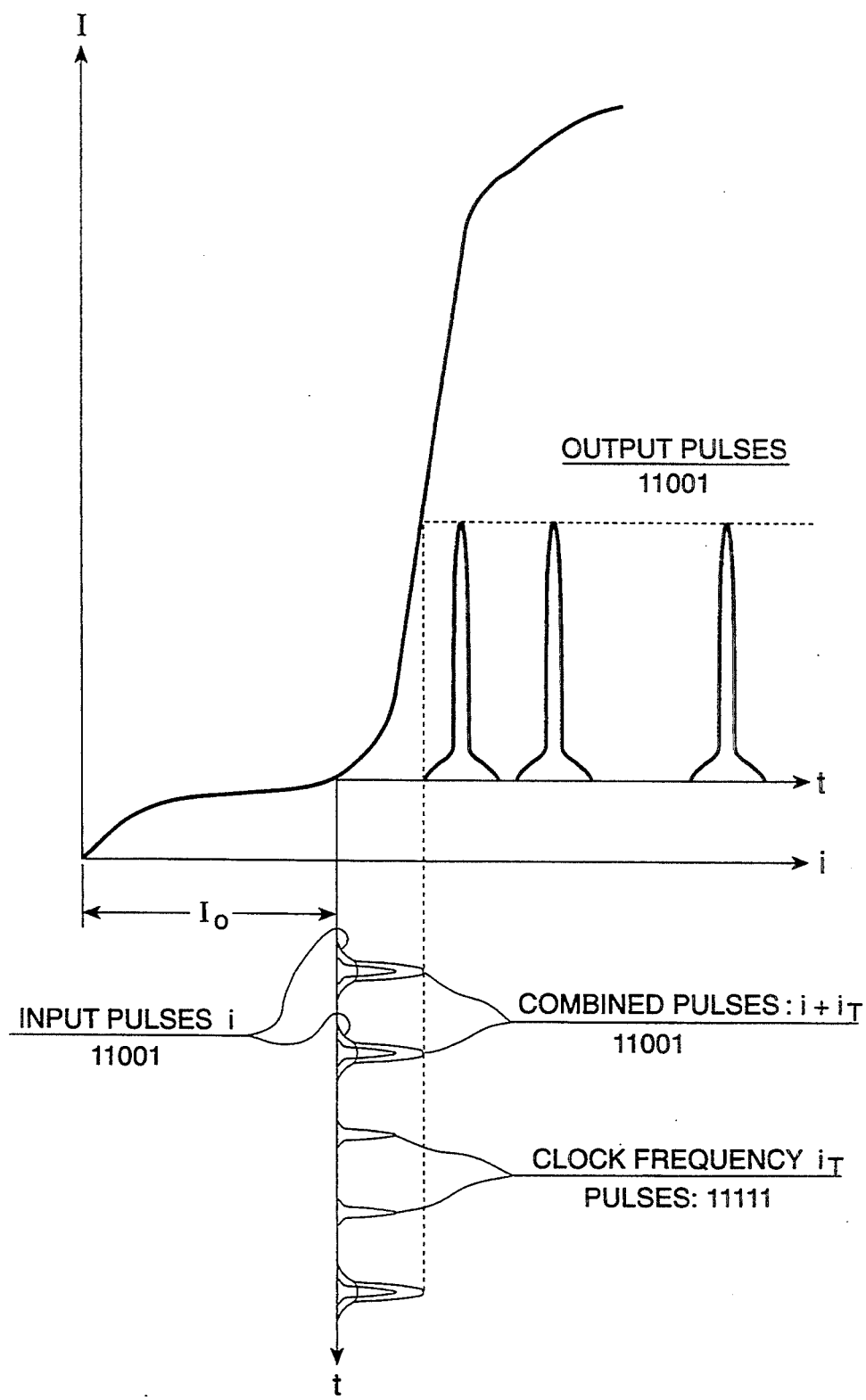

ALL-OPTICAL REGENERATOR

FIELD OF THE INVENTION

This invention pertains to the processing of digital information in the form of optical signals applicable in the areas of, e.g., optical-fiber communication and information transmission systems, and integral optics and computer engineering circuits; and, in particular, to an all-optical semiconductor device capable of performing such various functions as regeneration, amplification, and switching of optical signals.

DESCRIPTION OF THE PRIOR ART

There has been a growing demand for devices made of all-optical components for performing such functions as clock recovery, pulse reshaping and signal amplification without having to go through intermediate electronic stages. One possible approach to constructing, e.g., an all-optical regenerator may be based on a system wherein optical signals exist at all stages of signal processing with sufficiently high speed performance and simple configuration, preferably, by employing semiconductor components. Steady developments have been made towards this direction during the last decade.

One of such devices is disclosed in an article authored by W. T. Tsang et al., "Mode-locked Semiconductor Lasers with Gateable Output and Electrically Controllable Optical Absorber", *Appl. Phys. Lett.*, 43, No. 4, pp 339–341(1983), which consists of a three coupled laser diodes for the generation of a mode-locked semiconductor laser. In this device, a first laser diode serves as a source of radiation; and, together with an electrically controllable optical absorber it forms a laser with a saturable absorber, which geneates mode-locked optical pulses. A third diode serves as an electronic shutter for providing an electrically gateable mode-locked semiconductor laser capable of coding information on picosecond(ps) output optical pulses. Unfortunately, however, the problem of the output control has surfaced as a drawback for this type of devices to achieve the all-optical(i.e., completely optical) processing. Further, the device is essentially a laboratory mock-up utlilizing outside grating for the active mode-locking, whose practicability is, therefore, highly questionable.

Another device capable of selecting the clock frequency by using a multielectrode semiconductor laser has been proposed by M. Jinno et al. in their article, "All-Optical Timing Extraction Using a 1.5 μm Self-Pulsating Multielectrode DFB LD", *El. Lett.*, 24, No. 23, pp 1426–1427(1988). Enclosed therein is a device which operates in an optical injection-locking condition. This device is capable of synchronizing output optical pulses with the clock frequency under the effect of input pulses. However, the device is not a regenerator of optical pulses (signals) as it cannot amplify the signals nor can it regenerate their shape.

Other types of devices contemplated for use include a ring resonator (vibrator) or a Fabry-Perot interferometer for adjusting a definite frequency, as disclosed in "All-Optical Timing Eltraction Using Optical Tank Circuits", *Proceedings of* 100'89, *Technical Digest*, 4, pp 96–97(1989), by M. Jinno and T. Natsumoto, which generates optical pulses with a period coinciding with the roundtrip transit time of the ring resonator. Again, this device is not a regenerator of optical signals as it is not capable of reshaping the information signals in terms of their shape and amplitude.

One of the well known and more recent systems is the one based on two self-electro-optic effect devices (SEED). This device is capable of carrying out various functions of optical signals processing, with a 2 dB optical gain, including signal detection, clock recovery, data timing and signal clocking, wherein said SEED is biased through a parallel LC circuit. See C. R. Giles et al., "All-Optical Regenerator", *El. Lett*, 24, No. 14, pp 848–850(1988). From the practical point of view, however, this device comprising such electrical components is not preferable for all-optical regenerators; and, furthermore, no marked improvement in the recoverable data bit rate is expected from this device due to the inherent low response speed of SEED: as an illustration of the point, about 5 kbit/s has been reportedly achieved therefrom. Besides, the device cannot generate output signals in their desired shape, and/or pulse width.

The closest prior art device to the present invention, from the technical point of view, may be the one called, "Optical Transistor" as described in U.S. Pat. No. 5,001,523 issued on Mar. 19, 1991, which is intended to gate and amplify optical signals as well as to select the radiation of various frequencies by channels.

The advantages of this device reside in its high amplification factor, possibility for gating optical signals, its small-sized design, and the use of resonance rings as integral optic elements which permits the use of resonators with a high quality factor. There exist, however, certain deficencies in this device including: absence of elements for the generation of variable clock frequency; and its inability to achieve a complete regeneration of optical signals due to its inability to synchronize the output optical signals with the clock frequency.

SUMMARY OF THE INVENTION

It is, therefore, an primary object of the present invention to provide the so-called all-optical (completely optical) regenerator wherein optical signals exist at all stages of optical processing, and which is controlled by an input optical signal and performs various functions of optical signal processing, e.g., generating optical signals with preset parameters defining the shape and the amplitude of an output optical signal and synchronizing the output optical signal to the clock frequency.

In accordance with the present invention, there is provided an all-optical regenerator including one or more waveguides, each of said one or more waveguides having an input and an output optical contacts; a nonlinear ring resonator optically coupled to each of said one or more waveguides; and directional couplers, each of said directional couplers being provided with means for adjusting the optical coupling between the nonlinear ring resonator and each of said one or more waveguides and being positioned therebetween, wherein the nonlinear ring resonator comprises a source laser serving as a source of optical radiation; a multi-sectional laser for generating a clock frequency; mirrors for forming cavities for the source laser and the multi-sectional laser, each of said mirrors being provided at each of the interfaces between the two lasers and their adjacent parts in the nonlinear ring resonator; a multiplicity of phase modulators being provided between the two lasers and the directional couplers for synchronizing an output optical signal with the clock frequency; and means for controlling the source laser, the multi-sectional laser and the phase modulators.

The present device produces unique and remarkable properties which differentiate the instant invention from any of the known prior art devices including the one disclosed in U.S. Pat. No. 5,001,523 discussed above. To illustrate a few:

(1) Generation of output signals of a predetermined or desired pulse width and amplitude.

This is achieved in accordance with the present invention by the operation of the multi-sectional semiconductor laser and the phase modulators forming a single (common) resonator.

(2) Generation of a clock frequency.

This performance is attributable to the multi-sectional semiconductor laser operating in a mode-locking condition with a saturable absorber.

(3) Synchronization of the output optical signal with the clock frequency.

This result is attained due to the fact that the radiation of the multi-sectional semiconductor laser is incorporated in the common (single) optical field of the ring resonator and controlled by the phase modulators, in accordance with the instant invention.

(4) Generation and radiation of the clock frequency optical signal at any frequency fixed within the tuning range of 6 to 10 nm.

This flexibility is conferred by controlling the currents in the cells of the multi-sectional semiconductor laser.

The above and other advantages of the present invention are realized by the use of the elements constituting the regenerator. Specifically, the directional couplers permit the selection of radiation from channel to channel (see Rod C. Alferness, "Guided Wave Device for Optical Communication", *IEEE Journal of Quantum Electronics*, QE-17, No. 6, pp 945–957 (1981)) as well as the acquisition of bistabilized modes by virtue of positive feedback (see French Patent No. N2464498, GO2F 1/03, "Bistable Optical Device" (1981)). The optical feedback in the instant device is performed by employing the nonlinear ring resonator. Accordingly, the directional couplers essentially constitute a first stage of the optical signal amplification wherein the optical bistability mode is implemented (cf. V. M. Andreev, V. A. Verbitsky, S. A. Lomashevitch, "Optical Bistable Switching Device", *Communication Equipment Series: Wire Communication Engineering*, No. 6, pp 116–121).

The directional couplers of the present device in its normal condition (in the absence of an input optical signal) are adjusted to a minimum coupling coefficient. When an input signal is applied, this coupling is amplified due to the nonlinear properties of the nonlinear ring resonator which forms the nonlinear directional couplers together with the waveguides.

The increase of the optical radiation intensity in the nonlinear ring resonator for the directional couplers in turn produces an increase of pumping in the bistable nonlinear ring resonator, i.e., this unique characteristic further accelerates the transition of the switch-on state to an "upper" position shown in FIG. 2. In this case, since the optical coupling has been amplified owing to the change of the refractive index (its value in the coupled waveguides determines the coefficient and the length of coupling), the effect is found to be self-supporting and accelerating in the direction of the increase of the optical intensity in the nonlinear ring resonator.

It is well known that injection semiconductor lasers serve as a source of optical radiation and can be used to increase the intensity of an optical signal which is generated through one of the mirrors of their resonator (see Optical and Quantum Electronics, 21, Special Issue: Optical Amplifiers, pp S1–S25 (1989)).

The response of the nonlinear ring resonator is characterized by a feature that the refractive index n of the nonlinear phase modulator changes to transfer the nonlinear ring resonator towards a resonance condition which further increases the intensity of the radiation in the nonlinear ring resonator and changes the refractive index of the phase modulator, etc., leading the system to be in the resonance condition.

This resonance condition enables the optical system, wherein the above-described sequence of changes has been developed, to transfer stepwise to the "upper" position (see Kh. Gibbs, Optical Bistability, translated from English Ed. by F. V. Karpushko (1988)).

At definite initial detuning of the resonator, a differential amplification of the optical signal generated is realized. The amplification factor is determined by the slope of this characteristic curve 2 shown in FIG. 2. The amplification factor is equal to a value of $10^4$ for a bistable system, as has been empirically demonstrated (see F. Tooley et al., "High Gain Signal Amplification in an InSb Transphasor at 77K", *Appl. Phys. Lett.*, 43, No. 9, pp 807–809 (1983)).

The differential amplification characterizing the present device is carried out three times as follows:

(1) In the bistable device on the directional couplers, with the optical feedback through the nonlinear ring resonator, by introducing a signal into the nonlinear ring resonator;

(2) In the nonlinear ring resonator which is controlled by the nonlinear phase modulators whose properties depend upon the combined radiation of the input signal and the clock frequency therein and the resonance adjustment of the nonlinear ring resonator; and (3) At the output of the signal from the nonlinear ring resonator, again on the directional couplers.

The nonlinear ring resonator possesses a resonance characteristic for wavelength λ, which may be defined by the formula:

$$L = k(\lambda/2)$$

(wherein k is an integer; and L is the length of the resonator).

Such a resonator, providing an optical feedback from the lasers, becomes the resonator of the whole system, to be controlled and readjusted with the help of the phase modulators under the control electrodes 6 shown in FIG. 1 formed on the nonlinear ring resonator.

Thus, the radiation from the source laser and the multi-sectional semiconductor laser, the coupling between the directional couplers and other functional elements of the whole system can be controlled by means of the nonlinear ring resonator and by changing the parameters of the phase modulators. The control is performed via the electrodes 6 located over the nonlinear ring resonator.

The multi-sectional semiconductor laser operating in a mode-locking condition with a saturable absorber therein renders it possible to obtain a periodical continuous train of optical pulses with a pulse width having a fraction of ps to hundreds of ps. See I. S. Goldobin et al., "Control of Generation Spiking Mode of Two-component Heterolaser", *Quantum Electronics*, 12, No. 5, pp 983–985 (1985); and H. Kawaguchi et al., "Tunable Optical Wavelength Conversion Using a Multi-electrode DFB LD with Saturable Absorber," *Electron. Lett.*, 23, pp 1088–1090 (1987). The roundtrip transit time of the optical pulses generated by the multi-sectional semiconductor laser is determined by the formaula, $2L_1/c$, wherein $L_1$ is the length of the resonator of the semiconductor laser, c is the optical signal speed which corresponds to the gigahertz range applicable for semiconductor lasers.

Thus, the incorporation of the multi-sectional semiconductor laser and the directional couplers into a single (common) self-matched system makes it possible to incorporate spatially the optical radiation of input signals, the radiation of the source laser and the multi-sectional semiconductor laser in a single element, i.e., the resonance ring of the nonlinear ring resonator, wherein the output radiation is taken off and transferred to the optical output contacts III and IV shown in, e.g., FIG. 6.

In this case, the output optical signal is generated in a preset or desired amplitude and pulse width, the amplification taking place due to the optical bistability effect.

The output optical signal synchronization with the clock frequency is carried out by the phase modulators, which are brightened only at a synchronized supply of the input and the clock frequency signals.

It should be noted that the nonlinear ring resonator is an external resonator relative to the source laser and the multi-sectional semiconductor laser, which also enables the establishment of a single frequency mode of the output optical signal generation. See I. P. Kaminov, R. S. Tucker, "Mode-controlled Semiconductor Lasers" in *Guided-Wave Optoelectronics*, 26, ed. by T. Tamir, Springer-Verlag, pp 270–272(1988).

Use of electrodes, which allows to change the refractive index of the electro-optical media with the voltage change, is common in the so-called $\Delta\beta$ keys. See K. Tada et al., "Theory and Experiment on Coupled-waveguide Optical Modulators with Schottky Contacts", *Japan J. Appl. Phys.*, 18, No. 1, pp 393–398(1979).

In the present device, the electrodes located above the the non-linear ring resonator permit the latter to perform retuning of the clock frequency and, as a consequence, tuning the frequency of the output radiation.

The electrodes of the directional couplers serve to adjust the degree of the optical coupling between the linear waveguides and the nonlinear ring resonator.

BRIEF DESCRIPTION OF THE DRAWINGS

The present invention together with its objects and advantages will become more apparent in the detailed description of the preferred embodiments presented below with reference to the accompanying drawings, wherein:

FIG. 3 describes the procedure of the device operation at a simultaneous excitation of the input pulses (11001) and the clock frequency pulses (11111).

DETAILED DESCRIPTION OF THE PREFERRED EMBODIMENTS

Figure 1:
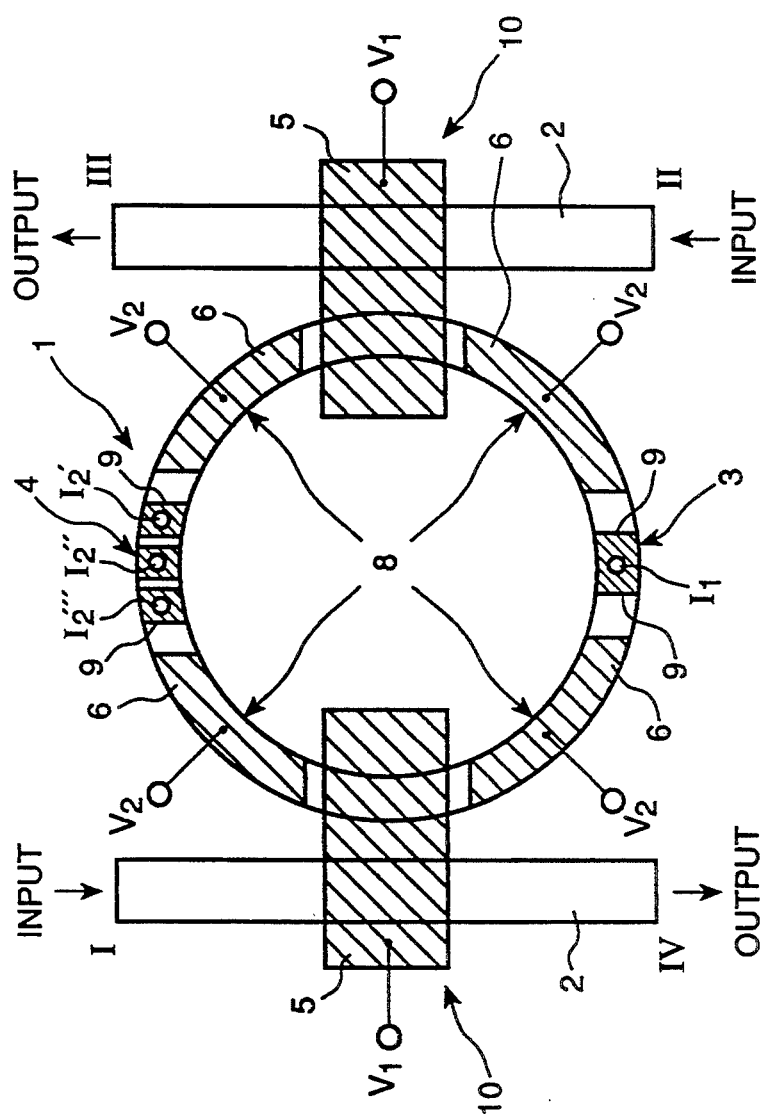
FIG. 1 illustrates a plan view of an all-optical regenerator in accordance with a preferred embodiment of the invention.

Shown in FIG. 1 is an all-optical regenerator of optical signals in accordance with the present invention, comprising a nonlinear ring resonator 1, a pair of linear waveguides 2 located diametrically opposite with resect to the nonlinear ring resonator, a source laser 3 which serves as a power source and amplifier of optical signals, and a multi-sectional semiconductor laser 4.

Electrodes 5 control the optical coupling, by means of voltage $V_1$, between the waveguides 2 and the ring resonator 1, forming directional couplers 10.

Application of voltage $V_2$ on the electrodes 5 enables the nonlinear ring resonator 1 to tune or adjust the characteristics of the output signals. Said voltage $V_2$ is supplied to the four separate sections which form the phase modulators 8. Reference numeral 9 denotes the mirrors of the source laser 3 and the multi-sectional semiconductor laser 4.

Figure 2:
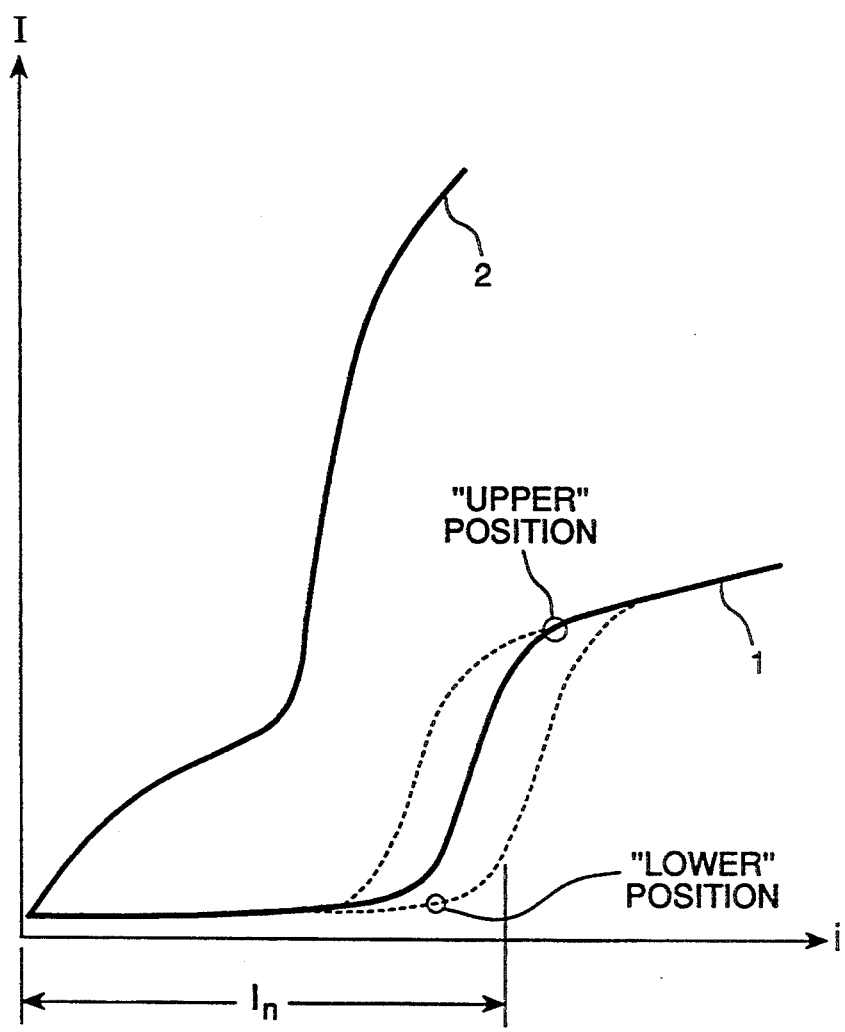
FIG. 2 shows the bistable characteristics of the all-optical regenerator illustrated in FIG. 1.

Turning now to FIG. 2, the output characteristics of the all-optical regenerator described in FIG. 1 are shown with the coordinate 1 representing the optical radiation in the phase modulators 8, while the coordinate I representing the output radiation. The characteristic of the bistable optical device is marked with dotted lines; while curve 1 shows the characteristics of the differential amplification and curve 2 illustrates the characteristics of the optical transistor employed in the present invention.

The optical bistability is evident owing to the fact that the medium is "brightened" under the effect of a positive feedback by acquiring the threshold value of radiation $I_n$(incident radiation).

The characteristics "light-light", i.e., $I_{output}=f(I_{input})$ (wherein $I_{input}$ denotes the intensity of the optical radiation at the input, and $I_{output}$ denotes the intensity of the optical radiation at the output), has a sharp rise or an unstable condition caused by the interaction of the optical radiation electromagnetic field with the atoms of, e.g., the semiconductor medium employed(see D. Miller, et al., "Optical Bistability in Semiconductors", *IEEE Journal of Quantum Electronics*, QE-17, No. 3, pp 312–317(1981)).

The possibilities and conditions for obtaining a bistable system at a laboratory level have been studied theoretically and experimentally; and observations have been made on the two-valuedness of the stable "lower"

and "upper" positions and the characteristics of the "triode" mode, i.e., the optical signal amplification for various types of the materials with nonlinearity such as the one illustrated on curve 1 in FIG. 2 (see A. Miller, D. Miller, S. Smith, "Dynamic Nonlinear Optical Processes in Semiconductors", *Advances in Physics*, 30, No. 6, pp 690–800(1981)).

Ultrashort pulses(e.g., ps or fractions of ps) in semiconductor samples are obtained by using the mode locking method, i.e., by maintaining the repetition rate of the laser constant by means of a saturable absorber. One of the cells of the multi-sectional semiconductor laser 4 may serve as such an absorber in accordance with a preferred embodiment of the present invention.

The present device is, therefore, able to ensure the generation of a constant sequence of short pulses with the pulse width and frequency of the laser being adjusted, depending on the material used, the geometrical dimensions and electrical signals and such other factors as the voltage on the saturable absorber and the currents in the active parts of the multi-sectional semiconductor laser.

The specific manner of operating the device shown in FIG. 1 shall now be described.

In the absence of an external input optical signal, the currents in the sections of the multi-sectional semiconductor laser 4 are selected such that a first section thereof serves as a saturable absorber($I_2' < 0$) and the other two are chosen to be the active ones operating in the radiation mode with their values of the injection currents higher than the threshold value, i.e., $I''_2$ and $I'''_2 > I_{th}$(see FIG. 1). It should be noted that the current value in the source laser 3 is lower than the threshold value, i.e., $I_1 < I_{th}$.

With such an adjustment of the radiation power in the phase modulators 8, the threshold value, at which nonlinear effects begin to appear, is avoided. That is, the nonlinear ring resonator is far from a resonance condition; and such condition is indicated as the "lower" position on curve 1 in FIG. 2.

When the optical radiation intensity in the phase modulators 8 exceeds the threshold value $I_{th}$, its "brightening" occurs and the nonlinear ring resonator 1 is turned to resonate.

In fact, if the refractive index n of the material used in the phase modulators has a dependence on the intensity of light $I_r$ as in $n = n_0 + n_2 I_r$ ($n_0$ being the refractive index in the absence of radiation, $n_2$ the medium nonlinearity coefficient), the nonlinear ring resonator is found to be in the "upper" position or condition(as shown on curve 1 of FIG. 2) as a result of the optical bistability effect when the radiation intensity reaches the threshold value and the refractive index changes from the value corresponding to the "lower" condition. This change occurs abruptly due to the sharply defined properties of the ring resonator, further influenced by the feedback and increase of the light intensity caused by laser switching.

The optical radiation inside the resonator changes the optical length of the resonator nL to the direction of resonance. The optical field inside the resonator increases, which shifts the resonance frequency still further towards the frequency of the input electromagnetic field, until a full resonance is achieved.

With the increase of the light intensity in the resonator 1, the optical field in the source laser 3 also increases owing to the injection of light while the density of carriers decreases, causing the refractive index in the laser active region to increase and the source laser 3 to be in a stimulated radiation mode, which in turn further increases the intensity of the light field in the system and causes a "jump" in the working point of the resonator 1 to the point of resonance as shown on curve 2 in FIG. 2. The above corresponds to the mode of a typical optical transistor (see Yu. L. Bystrov, S. A. Lomashevitch, Yu. V. Svetikov, "Optical Tansistor—New Functional Element of Engineering", *Electrical Communication*, N1, pp 22–25 (1992)).

Thus, the increases in the optical field intensity inside the resonator and the change of the refractive index tend to entail a smaller threshold value and a larger dynamic range in comparison with known bistable devices, as illustrated on curve 2 of FIG. 2.

The normal condition for the resonator is the "lower" position, which is in a switch-on state. In this case, only a simultaneous action of the input optical pulses and the clock frequency pulses generated in the multi-sectional semiconductor laser 4 allows the intraresonator radiation intensity to exceed the threshold value.

Figure 5:
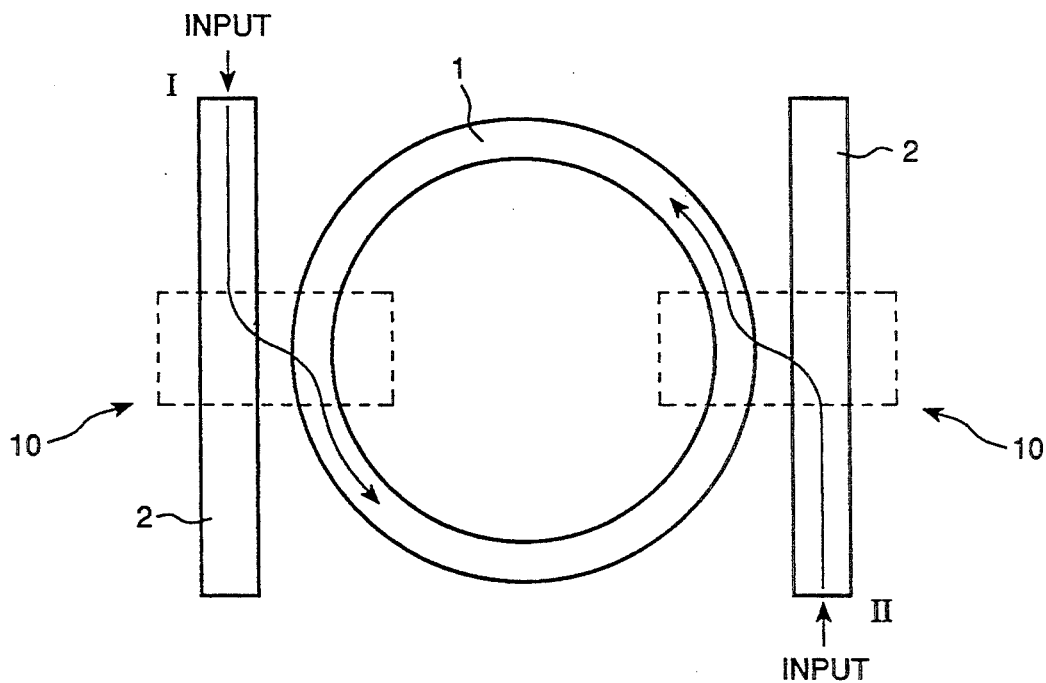
FIG. 5 depicts the "path" of the input optical signal in the nonlinear ring resonator from the waveguides via the directional couplers denoted by the rectangulars drawn in dotted-lines.

FIG. 5 indicates the path of the input optical signals through inputs I and II. Reference numbers 1, 2 and 10 denote the ring resonator, the linear waveguides and the directional couplers, respectively, as also shown in FIG. 1.

The external input signal 1 is applied simultaneously to inputs I and II of the device, for example, by use of a splitter. The optical signal passing through the input I is applied via a directional coupler 10 to the nonlinear ring resonator 1 (FIG. 5) and via the mirror 9 (FIG. 1) and further to the source laser 3 which, under the effect of this optical signal, transfers to a laser radiation mode.

For the device to operate reliably, it is required to synchronize the clock frequency pulses generated in the multi-sectional semiconductor laser 4 with the exteual input pulses.

Figure 4A:
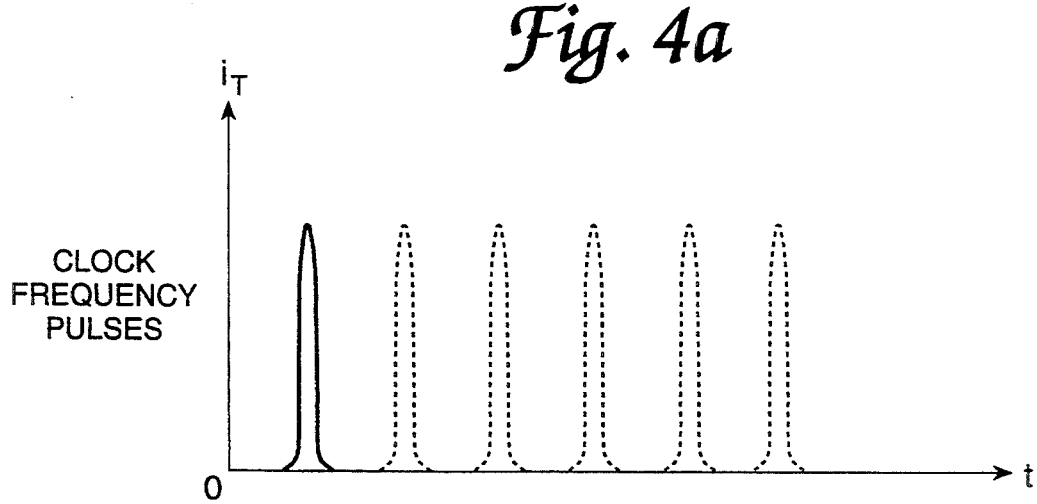
FIGS. 4a, 4b and 4c explain the procedure of synchronization and reclocking of the clock frequency pulses in conformity with the input optical signal.
Figure 4B:
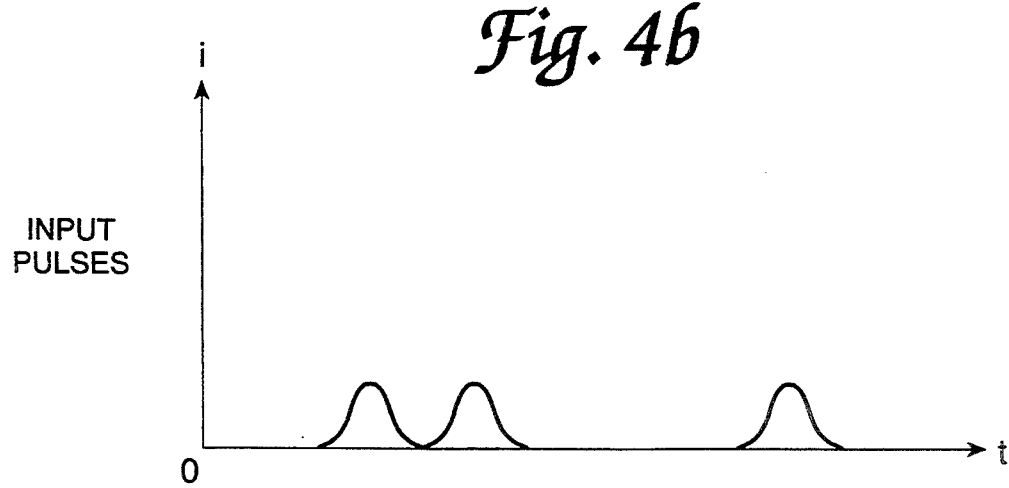
Figure 4C:
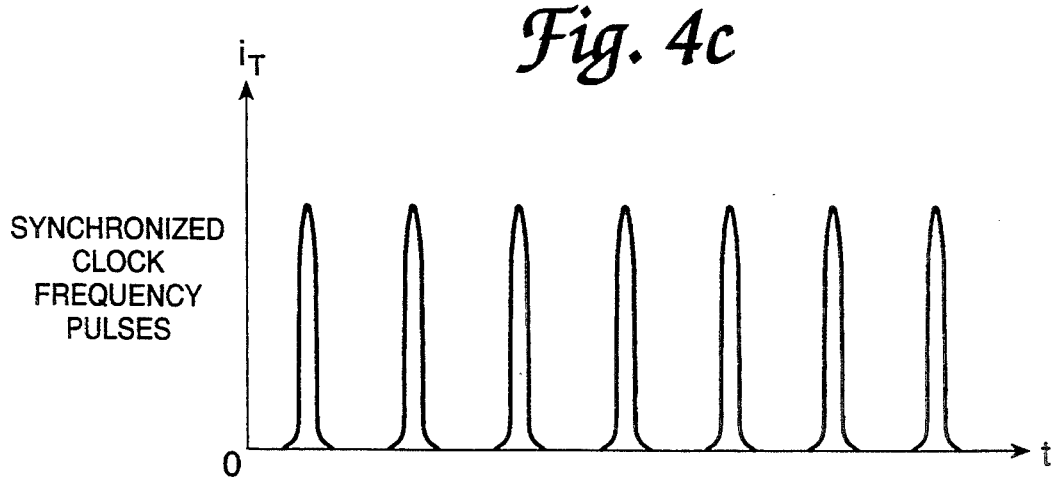

Therefore, the input optical signal is further applied through the input II and via the directional coupler 10 to the mirror 9 of the multi-sectional semiconductor laser 4, causing an additional brightening of the saturable absorber and, as a consequence, the optical mode synchronization by the pulse flow introduced to the multi-sectional semicondutor laser 4 as shown in FIG. 4c. FIGS. 4a, b and c show the process of synchronization of clock frequency pulses $i_T$ with the input pulse sequence of 11001.

As a result of the synchronization of the clock frequency pulses and the input pulses, they can be applied to the phase modulators 8 simultaneously. The cavity of the nonlinear ring resonator is found to be in a switch-on state by the optical field in the case when the optical radiation power supplied to the phase modulators 8 exceeds the threshold value. Such surpassing occurs when the synchronization condition between the clock frequency pulses and the input pulses is fulfilled, i.e., when the two trains of pulses appear in the phase modulators 8 in synchronization. In this case, the output pulse generation mode in FIG. 3 corresponds to the "unity" (1). FIG. 3 further illustrates the generation of the output optical signal of sequence 11001, $I_0$ being the optical pumping, i the intensity of the input pulses, and $i_T$ the intensity of the clock frequency pulses.

Figure 6:
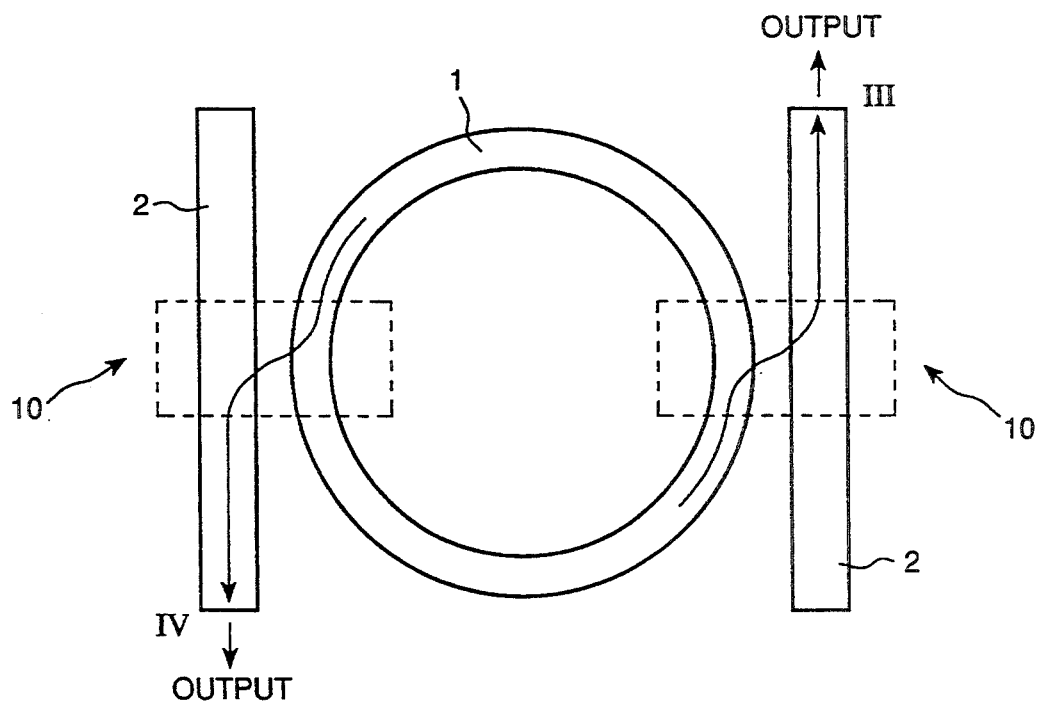
FIG. 6 presents the path of the output optical signals generated in the nonlinear ring resonator to the optical contacts III and IV of the waveguides 2.

FIG. 6 indicates the path of the output optical signal through the output optical contacts III and IV. The remaining reference numbers correspond to those shown in FIG. 5. The optical signal, via the directional couplers 10, is transferred from of the nonlinear ring resonator 1 to the output optical contacts III and IV.

The output pulse width is identical to that of the pulses from the multi-sectional semiconductor laser, i.e., it is within the range from fractions of ps to hundreds of ps depending on the degree of nonuniformity of the injected current in the cells of the multi-sectional semiconductor laser 4, and the material and design parameters. Accordingly, the choice of the material and dimensions of the semiconductor laser 4 may be strategically made so as to obtain the desired pulse width of the regenerated output pulses.

The amplitude of the output optical signal I is amplified to a value which is to be determined by the slope of the linear section of curve 2 of the optical transistor shown in FIG. 2 or 3. The slope of curve 2 may be adjusted by the material and design parameters and can be preset at the time of fabrication of the device, or modified by applying voltage to the phase modulators 8 or controlling the current supplied to the multi-sectional semiconductor laser 4 and to the source laser 3 based on the dependence of the refractive index upon the level of the injected carriers. Thus, synchronized introduction of the input optical pulses i and the clock frequency pulses $i_T$(FIG. 3) to the phase modulators 8 permits the nonlinear ring resonator 1 to acquire a light intensity which is sufficient to initiate the above-mentioned process of causing an avalanche-type change of the medium properties in the phase modulators 8, resulting in: a resonance condition in the medium, a change in the optical length of the nonlinear ring resonator, and, consequently, a change in the resonance tuning of the nonlinear ring resonator, an abrupt increase of the radiation intensity therein, and, finally, transfer of the entire system to the "upper" condition (position).

When the restricting conditions with respect to the parameters of detuning $\theta_0$(the phase angle for detuning the nonlinear ring resonator 1) and $\theta_1$(the phase angle for detuning the directional couplers 10 in the optical bistability mode) are satisfied, a differential amplification in the optical transistor i.e., the nonlinear ring resonator, becomes realized (FIG. 3).

During the operation in the optical signal amplification mode by employing currents $I_1$ and $I_2$(i.e., $I_2'$, $I_2''$ and $I_2'''$) shown in FIG. 1, the intensity value $I_0$ defined in conjunction with FIG. 3 is adjusted to correspond to the operating point on the characteristic curve I=f(i).

The amplified and regenerated pulses of the optical signals are taken in a narrow spectral region (the high quality factor of the nonlinear ring resonator at the point of resonance promotes this process) from the output optical contacts III and IV in conformity with the clock frequency (FIG. 6).

Three-component (for example, GaAlAs) or four-component (for example, InGaAsP) III-V compound semiconductors may be used for manufacturing the device in accordance with the invention, the composition thereof being selected depending on the wavelength of the optical radiation. Semiconductor structures such as the ones illustrated herein are grown using any of the known epitaxial growth techniques such as liquid phase epitaxy, vapor-phase epitaxy, molecular beam epitaxy (MBE) and metal-organic chemical vapor deposition (MOCVD). These techniques are described in the literature and are well known to those skilled in the art.

The design and structure of the active cells in the regenerator may be prepared by employing any of the above-mentioned methods and these cells are inserted in the corresponding etched wells in the nonlinear ring resonator. The insertion may be performed by using an indium-based solder.

The following structures may be preferably employed for the manufacture of the present device:

1. A double heterostructure may be used in the source laser 3 and the multi-sectional semicondutor laser 4.

Figure 7A:
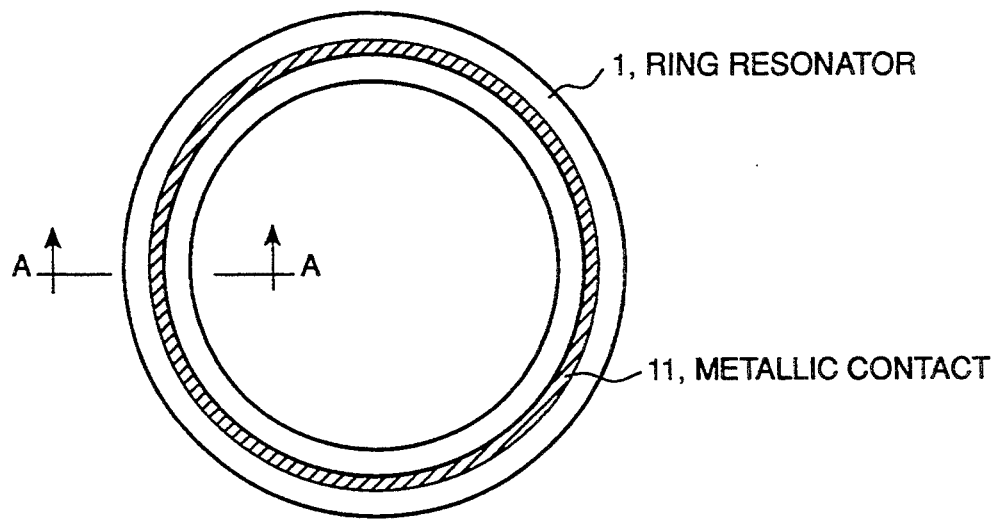
FIG. 7a offers the arrangement of the electrical contact for the case of the constantly distributed active medium.
Figure 7B:
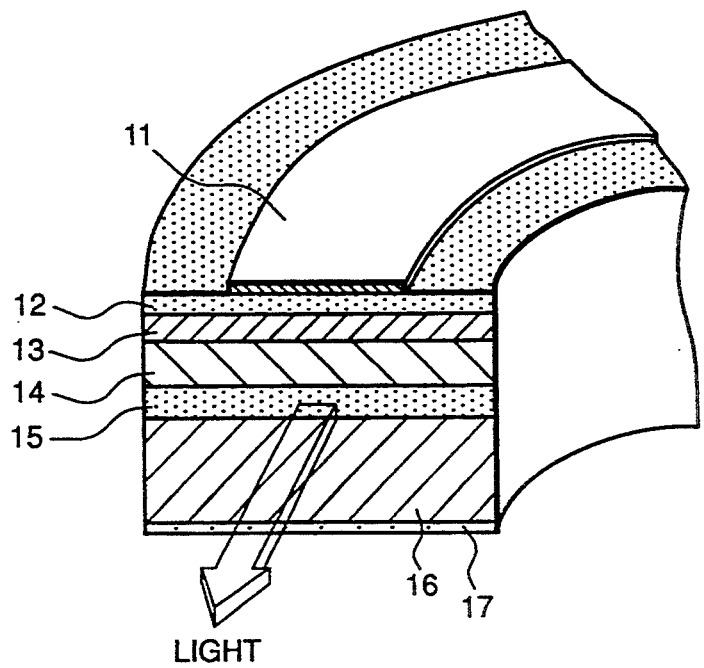
FIG. 7b discloses a cross section of a typical semiconductor structure useful in the present invention.

2. A simple structure may be achieved by incorporating a distributed active layer throughout the ring resonator. The formation of such an active layer is done by growing the heterostructure along the vertical direction thereof. FIG. 7a shows a plan view of the ring resonator and FIG. 7b illustrates a cross section thereof along the line A—A in FIG. 7a. Reterence numeral 11 given in FIG. 7a denotes a metallic contact. FIG. 7b illustrates a striped geometry having the metallic contact 11, an isolation layer 12, a buffer layer 13, a waveguide 14, an active layer 15, another waveguide 16, and a bottom contact 17. The confinement of the active layer in the plane is attained by way of employing the ring-shaped metallic contact 11 in FIG. 7a and the striped geometry shown in FIG. 7b.

Figure 8:
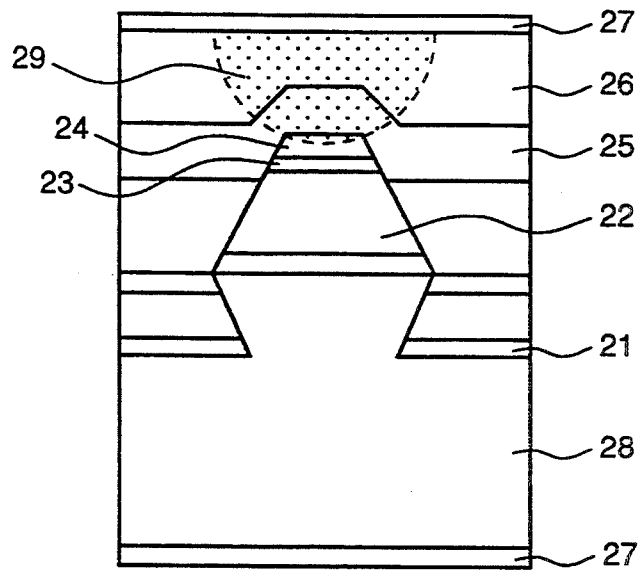
FIG. 8 represents a cross section of the double heterostructure of AlGaAs.

Making a narrow active layer in the buried heterostructure as shown in FIG. 8 represents another method of achieving the active layer confinement. Shown in FIG. 8 are a n-GaAs contact layer 21, a n-AlGaAs protection layer 22, an AlGaAs active layer 23, a p-AlGaAs protection layer 24, a n-AlGaAs buried layer 25, a n-GaAs contact layer 26, an ohmic contact 27, a backing layer 28, and an area with Zn diffusion 29. These are the possible structures obviating the use of the mirrors 9 shown in FIG. 1.

3. The realization of an ultrahigh speed information transmission is possible through the optical communication between the active cells via electromagnetic field. In order to construct a device, which is capable of operating at a sufficiently high speed of optical signal generation, it is required to provide mirrors for the lasers in the integral-optical device. This problem can be solved by using either distributed feedback or distributed Bragg mirrors.

Figure 9:
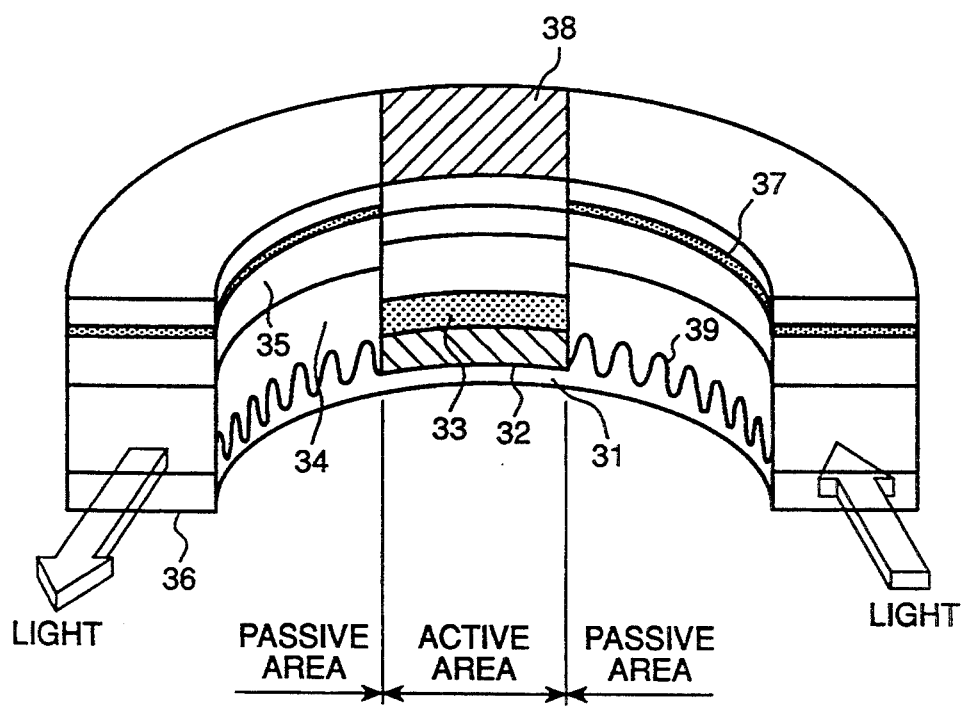
FIG. 9 protrays the integral-optical structure of the main elements of the device provided with distributed Bragg mirrors.

FIG. 9 shows a second structure in an InGaAsP system which is operable within the range of 1.5 to 1.6 μm wavelength. The arrows denote the direction of the radiation; and also shown therein are a backing layer 31, a waveguide 32, an active layer 33, another waveguide 34, restricting layers 35, an ohmic contact 36, an isolation layer 37, another ohmic contact 38, and a Bragg grid 39.

In preparing such a structure, the following techniques may be used: liquid-phase epitaxy, MBE, MOCVD, chemical etching and holographic lithography.

The following parameters may be preferably employed:

Active area: from 60 to 250 μm,

Stripe contact width: from 2 to 5 μm,

Active layer thickness: from 0.3 to 0.7 μm.

The distributed Bragg mirrors are preferably placed in a space between the active zones and is limited by sizes from 300 to 400 μm.

Figure 10:
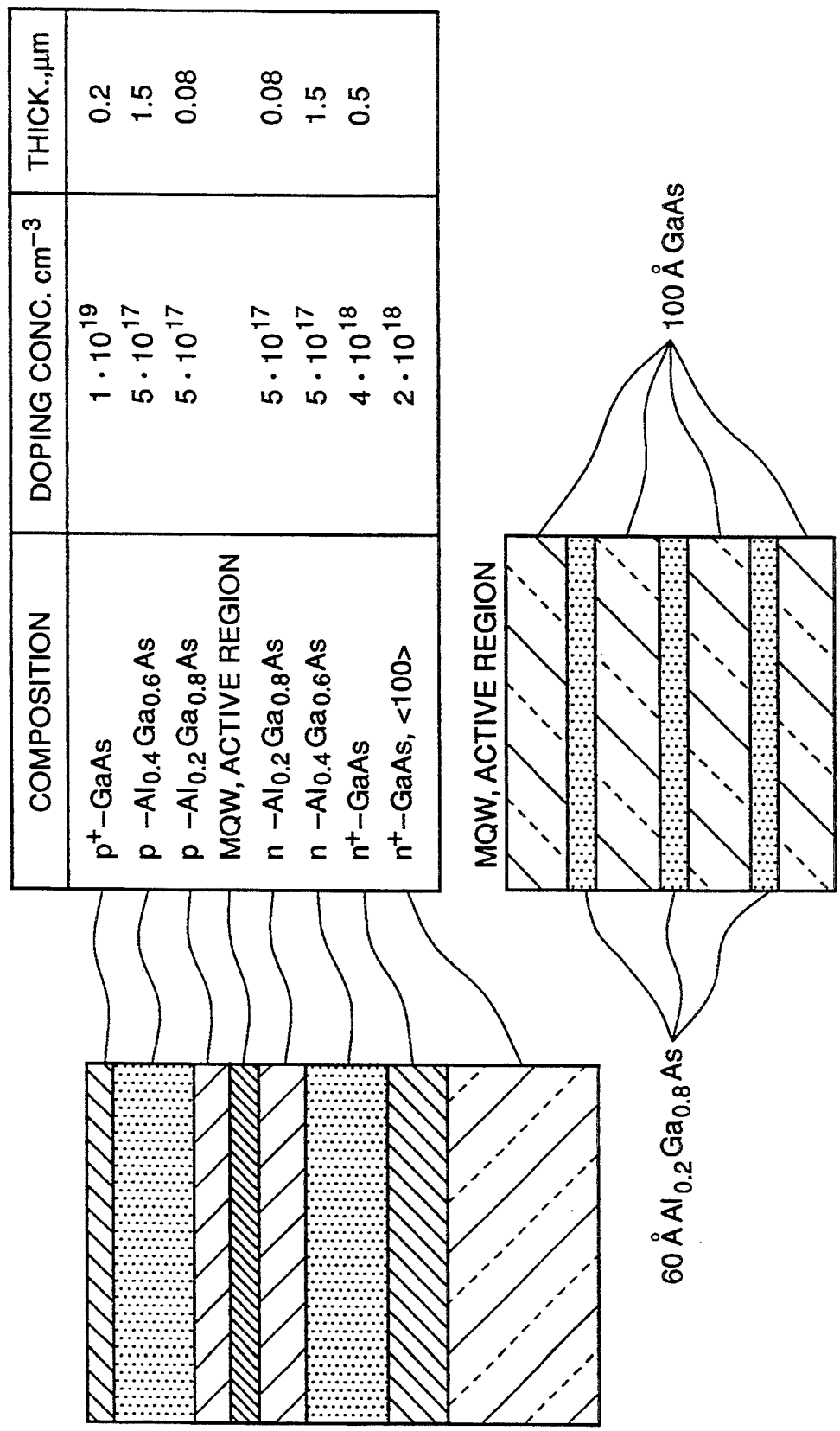
FIG. 10 exemplifies a semiconductor structure and a quantum well active region applicable to the instant invention.

The above-described design can be also realized in a quantum well structure represented in, e.g., FIG. 10. FIG. 10 illustrates a representative quantum-well structure of the semiconductors which may be used for the instant device, together with the indication of a typical composition and concentration of the carriers and the thickness of the layers.

In accordance with the present invention, a number of remarkable advantages can be attained. To recapitulate some of them:

1. Regeneration of optical signals distorted in shape and prolonged in pulse width while passing through the optical-fiber path;

2. Generation of the clock frequency pulses and the synchronization of the clock frequency pulses with a sequence of information signals;

3. Ability to operate in an optical generator mode within a tuning range of 6 to 10 nm wavelength; and 4. Capability of selecting an operation mode to the optical transistor mode and splitting or selecting output signals among optical channels.

While the present invention has been shown and described with reference to the particular embodiments, it will be apparent to those skilled in the art that many changes and modifications may be made without departing from the spirit and scope of the invention as defined in the appended claims.

What is claimed is:

1. An all-optical regenerator including one or more waveguides, each of said one or more waveguides having an input and an output optical contacts; a nonlinear ring resonator optically coupled to each of said one or more waveguides; and directional couplers, each of said directional couplers being provided with means for adjusting the optical coupling between the nonlinear ring resonator and each of said one or more waveguides and being positioned therebetween, wherein the nonlinear ring resonator comprises:

a source laser serving as a source of optical radiation;

a multi-sectional laser for generating a clock frequency;

mirrors for forming cavities for the source laser and the multi-sectional laser, each of said mirrors being provided at each of the interfaces between the two lasers and their adjacent parts in the nonlinear ring resonator;

a multiplicity of phase modulators being provided between the two lasers and the directional couplers for synchronizing an output optical signal with the clock frequency; and means for controlling the source laser, the multi-sectional laser and the phase modulators.

2. The all-optical regenerator according to claim 1, excepting that said mirrors of the two lasers are formed in the shape of a Bragg mirror or replaced with a distributed feedback structure in the shape of a Bragg grid.

3. The all-optical regenerator according to claim 1 or 2, wherein said means for controlling the two lasers and the phase modulators comprises means for adjusting current and/or voltage thereof.

4. The all-optical regenerator according to claim 3, wherein the phase modulators are of a nonlinear phase modulator.

5. The all-optical regenerator according to claim 4, wherein the two lasers are made of a same or different semiconductor material.

6. The all-optical regenerator according to claim 5, wherein the multi-sectional laser comprises a section functioning as a saturable absorber.

7. The all-optical regenerator according to claim 6, wherein the regenerator comprises two linear waveguides being positioned outside of the nonlinear ring resonator in a diametrically opposite relationship with respect to the nonlinear ring resonator.

8. The all-optical regenerator according to claim 7, wherein said adjusting means provided in the directional couplers comprises means for adjusting current and/or voltage thereof.

9. The all-optical regenerator according to claim 8, wherein amplification of optical signals is carried out on the directional couplers with an optical feedback through the nonlinear ring resonator when said optical signals are being introduced into the nonlinear ring regenerator, further carried out when said optical signals are within the nonlinear ring resonator, and still further carried ont on the directional couplers when said optical signals are emitted from the nonlinear ring resonator.

10. The all-optical regenerator according to claim 5, wherein the two lasers comprise a multipicity of quantum well active layers.

* * * * *